United States Patent

Stern et al.

Patent Number: 5,576,948
Date of Patent: Nov. 19, 1996

[54] MACHINE VISION FOR ADAPTIVE LASER BEAM STEERING

[75] Inventors: Howard Stern, Greenlawn; Fereydoun Maali, New York, both of N.Y.; Stanley Elstein, Rehovot, Israel

[73] Assignee: Robotic Vision Systems, Inc., Hauppauge, N.Y.

[21] Appl. No.: 319,415

[22] Filed: Oct. 6, 1994

Related U.S. Application Data

[63] Continuation-in-part of Ser. No. 921,316, Jul. 28, 1992, abandoned.

[51] Int. Cl.$^6$ ................................................. G05B 19/18
[52] U.S. Cl. .................... 364/167.01; 364/559; 382/145; 382/173
[58] Field of Search ................. 364/167.01, 559–565, 364/474.03, 474.05, 474.37; 382/103, 106, 107, 145, 146, 153, 154, 173–180, 171; 356/4.01, 3.01, 3.03, 3.09, 3.06, 3.07

[56] References Cited

U.S. PATENT DOCUMENTS

| | | | |
|---|---|---|---|
| 5,054,098 | 10/1991 | Lee | 382/46 |
| 5,113,080 | 5/1992 | Lev et al. | 356/1 |
| 5,193,120 | 3/1993 | Gamache et al. | 382/1 |
| 5,402,364 | 3/1995 | Kitoh et al. | 364/566 |
| 5,418,608 | 5/1995 | Caimi et al. | 356/3.01 |
| 5,446,529 | 8/1995 | Stettner et al. | 356/4.01 |
| 5,452,370 | 9/1995 | Nagata | 382/153 |
| 5,465,304 | 11/1995 | Cullen et al. | 382/176 |

*Primary Examiner*—James P. Trammell
*Attorney, Agent, or Firm*—Max Fogiel

[57] ABSTRACT

An arrangement for steering the laser beam, in an active optical triangulation method based on three-dimensional sensors, along paths which are sensitive to the context of the scene of interest, and alleviating the need to undergo a search path by the sensor. A conventional video camera is used to preview the scene of interest and the resultant intensity image is processed to locate the desired path based on the scene context. The sensory system is modeled to enable determination of the instantaneous angular deflections of the laser beam along with the translation of the laser source that can shift the nominal or actual data acquisition path to the desired data acquisition path.

8 Claims, 6 Drawing Sheets

MACHINE VISION FOR ADAPTIVE LASER BEAM STEERING

The present invention is a Continuation-In-Part of the parent application Ser. No. 921,316 filed Jul. 28, 1992, abandoned.

BACKGROUND OF THE INVENTION

In three dimensional vision (3D) systems, a primary task is to measure the x, y, and z components of various key points on a sample under inspection. If the location of the various key points falls within prescribed limits, the sample passes the inspection.

One means of doing 3D vision involves the use of active optical triangulation which works as follows: a light source, such as a laser, produces a thin beam which is focused onto a sample under inspection. The resultant illuminated spot on the sample is imaged onto an optical photo-sensor, such as a charge coupled device (CCD) or position sensitive device (PSD). The height of the sample may be determined from a knowledge of the spot location on the image plane of the sensor. By moving the apparatus, consisting of the light source and sensor, relative to the sample, the height of various points on the sample may be measured.

One application of 3D vision is the measurement of location and height of leads on electronic integrated circuit chips (ICs). In a typical machine, the 3D sensor, consisting of the light source and photo-sensor is mounted to an X-Y motion stage which moves the sensor over a rectangular region. ICs are moved into this region and inspected by the sensor which is moved over the ICs by the motion stage. The inspection consists of sampling the location of key features of the IC such as the location of each of the lead tips, the lead width, the lead height, the distance between leads, and other features.

One of the issues associated with the 3D inspection process is the minimization of the inspection time and the amount of data needed to properly characterize the IC. Restricting the discussion to the case of inspecting only the leads of the IC, the sensor would first be moved to the region of the inspection zone bounding the extremities of the IC. Inspection would then consist of sampling various points in this region to determine the presence of the IC leads and their geometrical characteristics.

This invention is concerned with a method of restricting the search region for the multiplicity of IC leads and the amount of data required to determine the lead characteristics.

The search is typically carried out by a combination of two methods. In the first method (mechanical scanning), the sensor is positioned at an x,y location (the x and y coordinates are associated with the planar, rectangular search region), and the sensor determines the z-height associated with this location. The sensor is then moved to a new position and the z-height measured. A lead is determined to be present at a given location if the value of z falls within a certain range. The edge of a lead is determined from a transition in z values of neighboring points in the search region.

In the second method (electronic scanning), the sensor is held fixed and the light beam is moved using a typical light deflection means. The z-height is determined at each of the several x,y deflection locations of the illuminated spot in the search zone. Typical light deflection means include moving mirrors and acoustical-optical deflectors.

In many applications such as vision-based inspection and metrology, the uncertainty in the position of the feature of interest necessitates either a relatively slow search by mechanical scanning intertwined by a fast search in laser beam deflection, or only a fast search confined to laser beam deflection with the sensor traversing along an assumed nominal path.

Both of these searches, particularly search by mechanical scanning is detrimental to the throughput in many applications.

The object of the present invention is to remove the need for the aforementioned searches.

The present invention is discussed, particularly in the context of data acquisition for quad flat pack devices, a currently popular IC package containing up to several hundred leads.

The leads on quad flat packs are located on all four sides of the body. Each side has a multiplicity of leads extending out from the body parallel to each other and approximately the same length. The ends of the leads (furthest from the chip body) are referred to herein as the lead toes.

The object of the present invention is to most economically find the location of the nominally straight line joining the lead toes for each of the four chip sides. This information is used to optimally control the x, y motion and the light deflection mechanism.

SUMMARY OF THE INVENTION

It is the object of the present invention to overcome the need of performing a prior search, both through laser beam scanning or mechanical scanning and guide the data acquisition directly to the desired path. When the path correction is small enough, the change is carried out through laser beam deflection. Otherwise, the sensor is translated.

Realization of the present invention is accomplished by outfitting a 3-D sensor with a 2-D sensor such that the latter can preview the scene. The resultant 2-D image is processed to determine the straight line joining the lead toes to extract the desired x, y path for the sensor- This path may then be also optimized through the use of light beam deflection in addition to sensor translation.

Figure 4A:
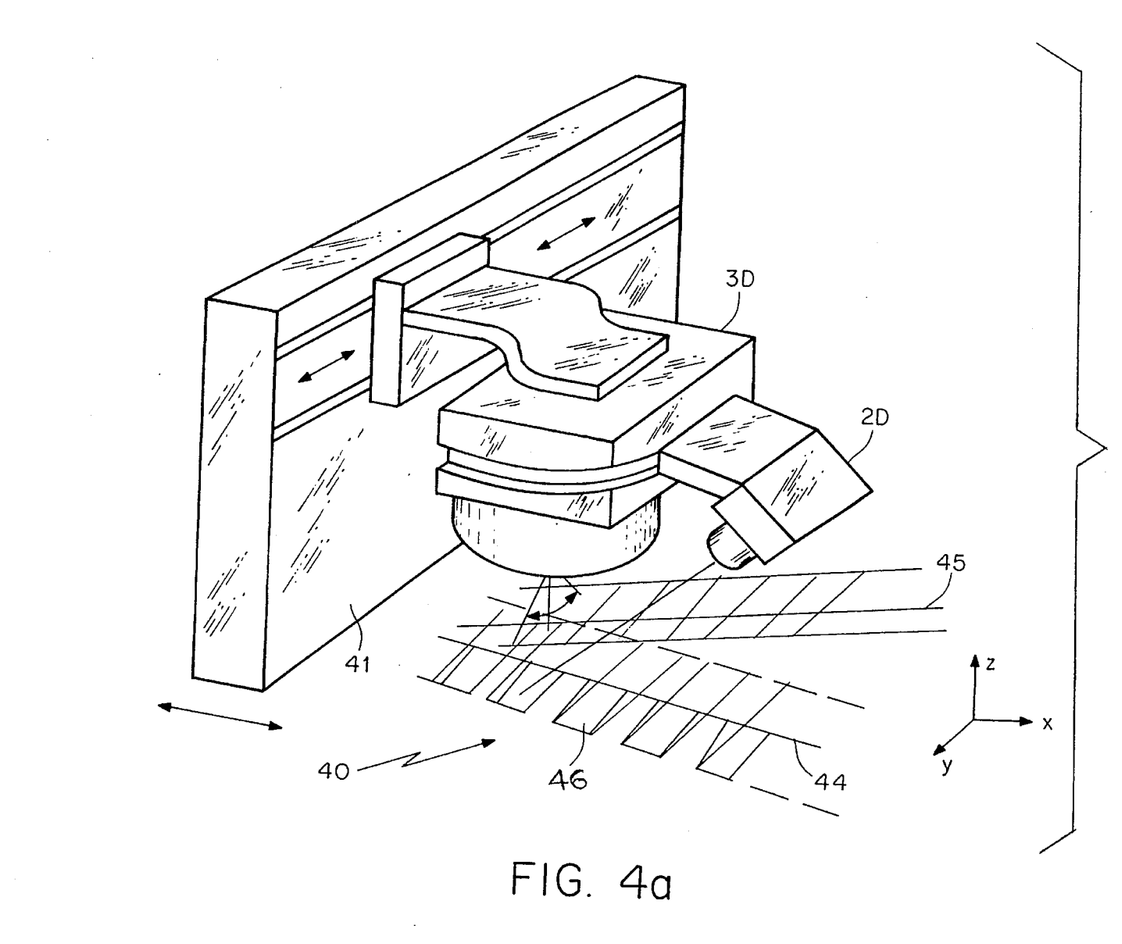
FIG. 4a shows one implementation of the adaptive beam steering method described in the disclosure.
Figure 4B:
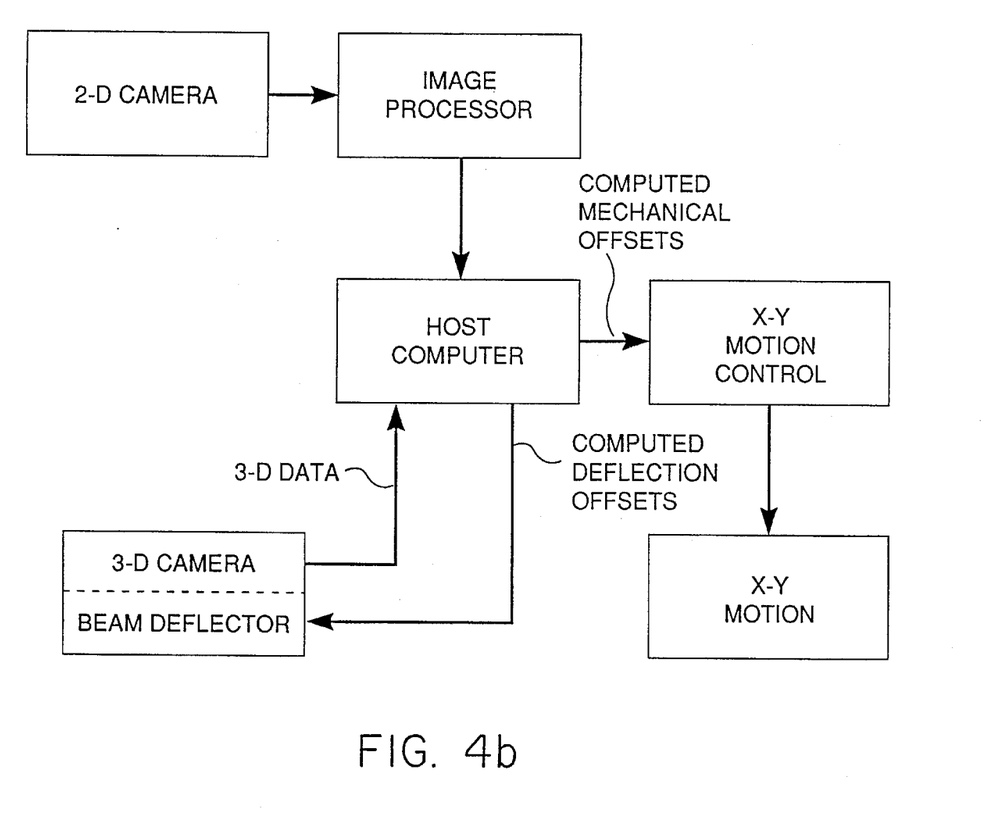
FIG. 4b is a functional block diagram associated with the processing done in the described implementation.

One possible implementation is shown in FIG. 4a. A 3-D camera 42 and a 2-D camera 43 are rigidly connected together and mounted to an x-y motion stage 41 which moves the cameras in both x and y directions over an inspection plane 40 containing a sample to be inspected. The toe line of the leads lies along the "best" straight line fit 44.

The 3-D camera would determine the Z-heights at sample points (x, y) as indicated by the coordinate system in FIG. 4a. Without prescan information the 3-D camera 42 would move along the line 45 as a result of the action of the x-y motion which would be programmed to move the camera along this line. In this case, the sensor acquires data samples that do not fully encompass the lead tips. The illumination beam in the camera would be scanned about the blind scan line 45 causing the photo-sensor to acquire Z-heights at (x,y) locations intercepted by the scanned illumination beam. The desired Z-height information would be obtained when the beam intercepted the IC leads at positions along line 46. Unnecessary information would be collected, however, while the illumination beam scans the region between lines 45 and 46. With the use of the 2-D preview feature, the scan may be redirected to follow line 44 which also corresponds to the optimum scan path. This may be done by:

1) Deflecting the illumination beam immediately to the vicinity of the leads 46, and
2) causing the line of motion 45 to be modified bring the 3-D camera closer to line 44 in cases where the distance between lines 44 and 46 exceeds the capabilities of the illumination deflection means.

BRIEF DESCRIPTION OF THE DRAWINGS

FIG. 4b shows the processing functional block diagram for the implementation. The image from the 2-D camera is processed and fed to the host computer which computes required mechanical and/or laser beam offsets and sends the information to the x-y motion control and to the illumination deflection drive circuits.

DETAILED DESCRIPTION OF THE INVENTION

Figure 1:
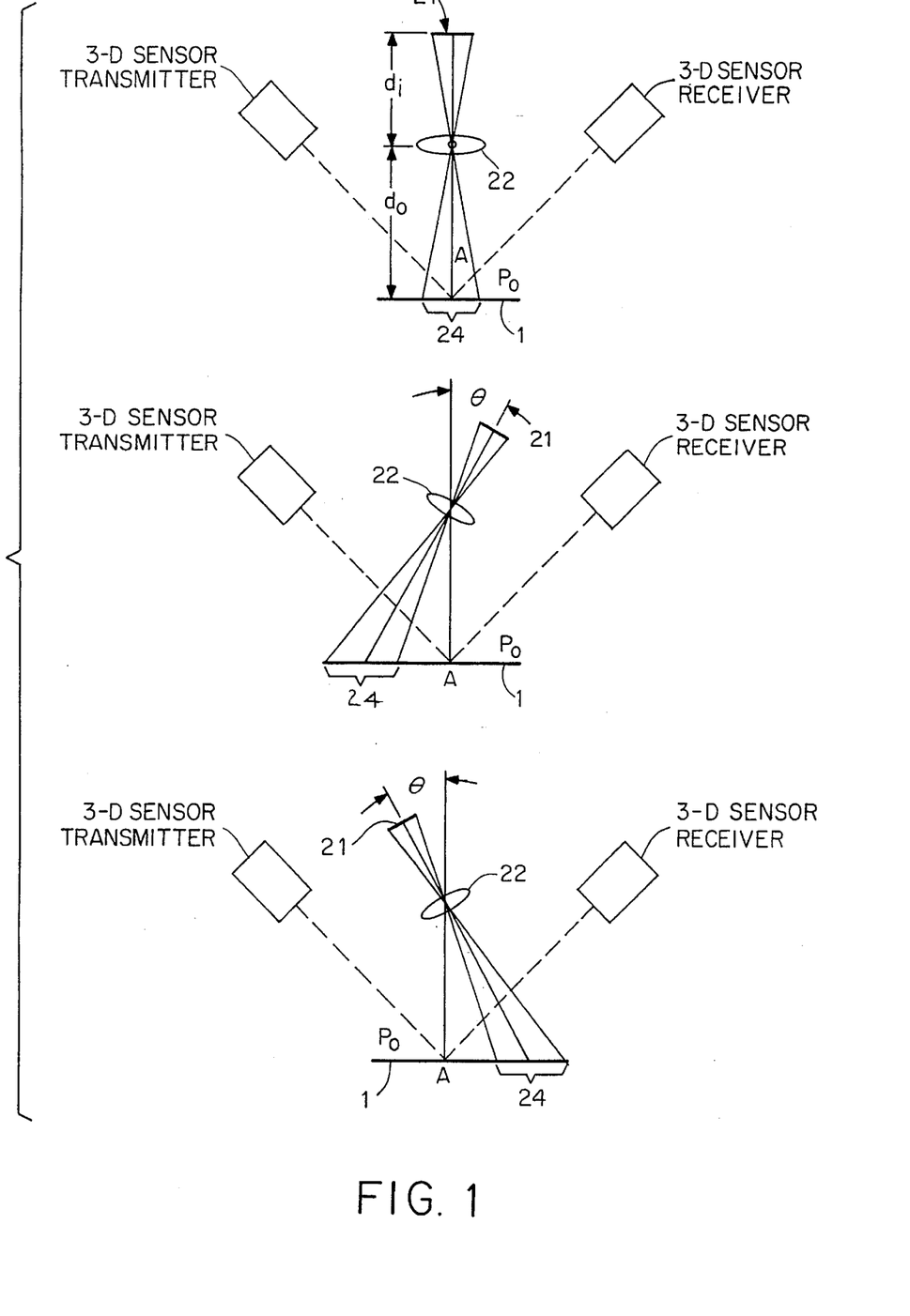
FIG. 1 is a schematic diagram of a 3-D sensor with attached two-dimensional sensor which is pivoted to view the scene of interest, according to the present invention.

A preferred embodiment of the present invention employs a conventional video camera along with its attached lens assembly as shown in FIG. 1. A video camera 21 and its associated lens assembly 22 comprise a 2-D sensor. The 2-D sensor is mechanically attached to a 3-D sensor and both are mounted to a carriage frame assembly. The sensors are moved to the inspection region by the sensor carriage assembly which can move up and down and hence maintain the lens conjugate plane center of the 2-D sensor at the machine datum plane, P0, where the lead toes 32 are to appear. The 2-D sensor is pivoted into position on either side of the 3-D sensor, based on the direction of movement of the carriage assembly so as to enable the scene of interest to be imaged and processed by the 2-D sensor prior to scanning by the 3-D sensor. The 2-D sensor upon assuming either of the two attitudes is locked by a solenoid-operated mechanism into position.

Figure 2:
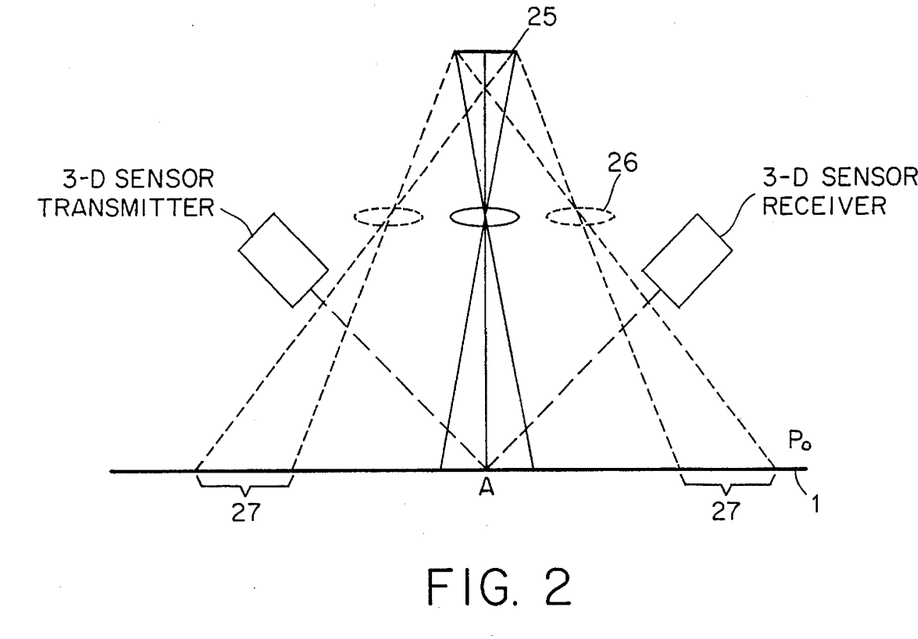
FIG. 2 is a schematic diagram of a 3-D sensor with attached two dimensional sensor. The 2-D sensor is held stationary while the focusing optics is translated to enable the two-dimensional sensor to view the scene of interest.

In another embodiment of the present invention, the 2-D sensor assumes a detached camera-lens configuration as shown in FIG. 2. To preview the scene, the lens assembly 26 is translated to either side of the 3-D sensor.

The focal plane of the 2-D sensor 21 of FIG. 1 is assigned x and y coordinates along the rows and columns of its photosensitive elements, respectively. The 2-D sensor is so aligned that the focal plane x-axis exhibits an angle theta with the datum plane, P0, and is positioned so that its lens conjugate plane intersects the datum plane, P0, at the sensor optical axis.

During the calibration process for the 2-D sensor, elements in the focal plane are related to absolute distances at the conjugate plane of the lens. The lens field curvature in this instance may be ignored since the expected field of view is small.

The tilt of the 2-D sensor focal plane with respect to the machine datum plane causes a foreshortening of distances which is geometrically corrected by multiplying the x-coordinates by sec theta.

The 2-D camera is next register with the 3-D sensor, whereby its coordinate system is related to that of the 3-D sensor. This may be done by using a calibration block that presents a protruding rectangle to both sensor systems. Key points on the protruding rectangle (such as the vertices) are measured by each sensor. Since the two coordinate systems differ at most by a rotation and a translation, they may be related to each other by a 3×3 transformation matrix. The elements of this matrix are determined by substitution of the coordinate values of the measured key points of the protruding rectangle into the matrix equation. The matrix elements provide the necessary registration relationship between the 2-D and 3-D sensor coordinate systems.

Since the 2-D sensor assumes two positions with respect to the 3-D sensor, the registration process is performed for each position yielding two inter-sensor registration matrices. Through these registration matrices the 2-D sensor coordinate system can be projected onto the global machine coordinate system of the 3-D sensor.

The coordinates of the laser source, Q1 (see FIG. 5), along with the equation of the laser plane, P1, of the 3-D sensor are determined by projecting the laser beam at, for example, two different angles and noting the coordinates of the illuminated points on the surface of the calibration block as it is being raised or depressed through the sensor's view volume. This yields two point sets each associated with one orientation of the laser beam. The elements of each point set are fitted to one of two 3-D lines L1 or L2 and the elements of both point sets are fitted to a plane, P1, using the method of least squares. The lines are next projected onto the plane, P1, giving rise to two coplanar lines that intersect at a point representing the laser source of the 3-D sensor, Q1.

The steps so far described are off-line processes and need only precede those described hereafter.

An image is snapped by the 2-D sensor and buffered.

The location of the lead edges is determined from the buffered image. The gray level histogram of the image is first constructed. This operation may be performed on the fly as the image is being acquired.

The histogram is processed to extract an adaptive threshold for subsequent binarization of the image. The threshold must be such that it yields the leads boundaries 32 (see FIG. 3) in general, and the lead toes in particular, while suppressing other regions in the resulting binary image.

Figure 3:
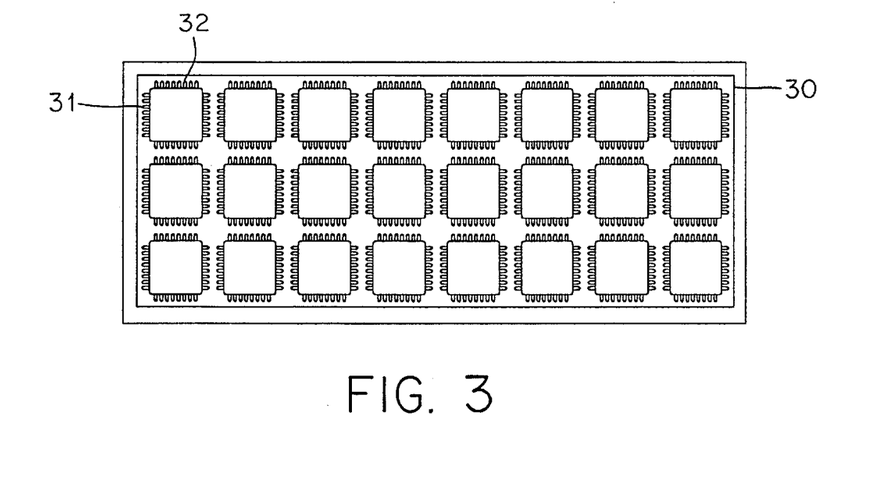
FIG. 3 is a plan view and shows the arrangement of quad flat pack devices in their supporting tray.

Generally, the leads are expected to appear brighter than the device 31 and tray surfaces 30. There are, however, instances of some device label or undue reflection from the tray walls defying this assumption. As their areas do not overwhelm those of the leads, however, or when they do overwhelm, in this manner, their contrast against the leads is small compared to the contrast between the leads and background. The adaptive threshold is therefore adequate for all instances encountered.

Determination of the adaptive threshold is achieved by area quantizing the histogram; deriving a discrete function from the span of the successive area quanta, differentiating the function and then locating their two successive maxima and their mid-point; backprojecting the mid-point to the area quantized histogram and then to the original gray level histogram, and obtaining the adaptive threshold for subsequent image binarization; and binarizing the image.

The discrete histogram is formed by determining the frequency of occurrence of the various grey levels of the pixels. These pixels are then "binned" that is they are assigned to a particular grey level bin containing all the pixels with gray level values within a certain range. The particular histogram method used uses a variable range depending on the nominal gray level assigned to a particular bin. The range is selected so that after all pixels are assigned to bins, the number in each bin is equal. Thus, if there are a large number of pixels with about the same gray shade, the range assigned to that grey shade bin would be small.

The next step is to tabulate the ranges of the bins in the order of their nominal grey shades. Then, the two largest finite maxima of this discrete function of bin range size vs grey shade are evaluated by determining the finite difference between the range sizes of nearest neighbors. The two largest positive differences are selected. The midpoint grey level value between the two grey levels corresponding to the differences is selected as the adaptive threshold for the image frame being analyzed.

Applying the adaptive threshold level to each pixel in the image, a binarized image is produced.

A method is now presented for extracting the best straight line fit to the toe location of each of the IC leads along one side of the chip. (See FIG. 6 for a simplified example of the process which is described in the following text.)

Figure 6:
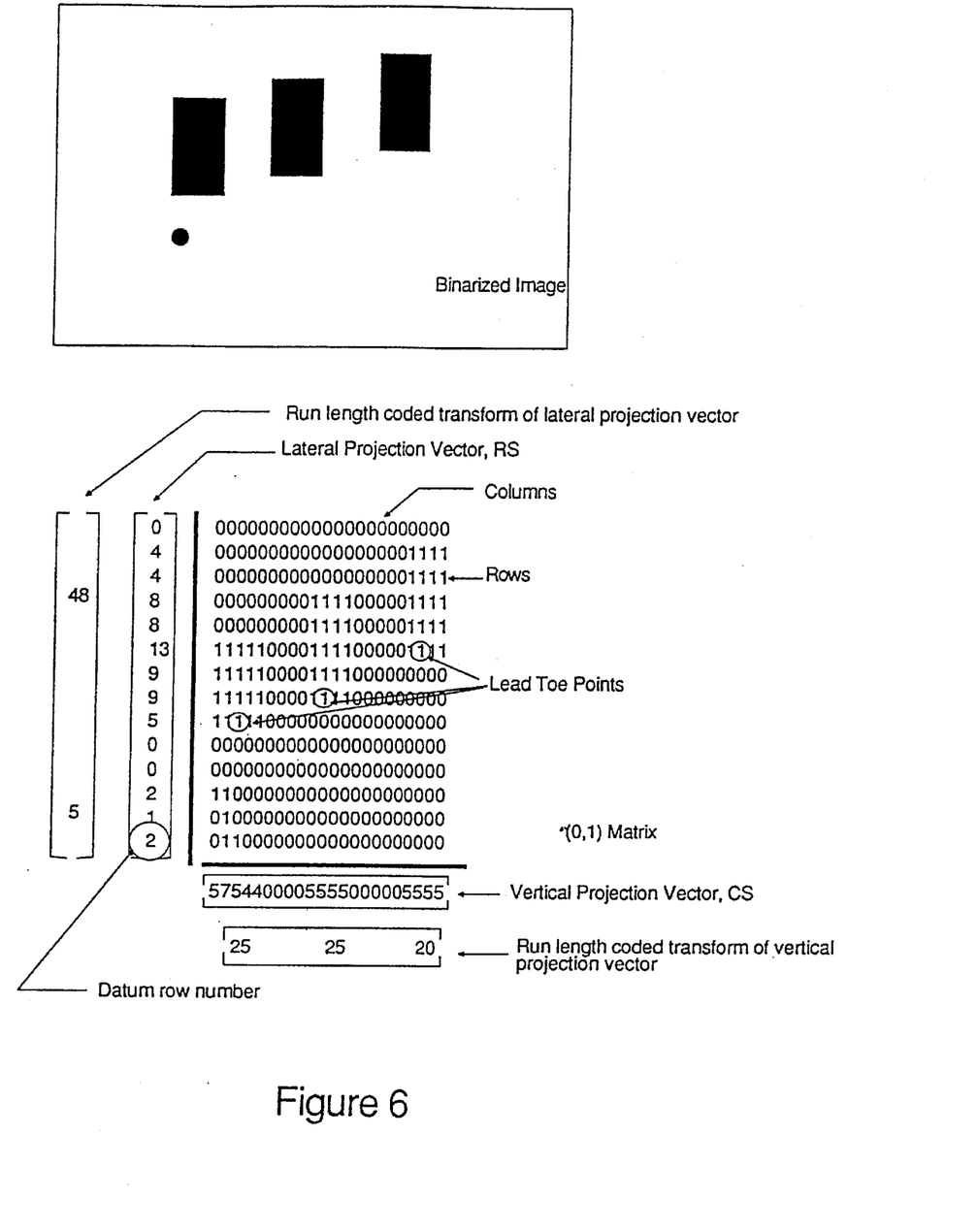
FIG. 6 shows a simplified example of the process for extracting the best straight line fit to the toes of each IC lead.

The binarized image may be viewed as a (0,1)-matrix whose lateral projection may be viewed as a vector which is clipped at a predefined fraction of its maximum. The projection vector is run-length coded in such a way that each run signifies a sequence of non-zero elements for each of which an objective function is derived. The objective function is based on the product of each run-length by a weighting function representing the cumulative sum of the points supported by that segment of the projection vector. The run exhibiting the maximum objective function is located and those runs which exhibit objective functions below a predefined fraction of the maximum objective function are suppressed. Proceeding in ascending or descending row numbers, based on orientation of the device, the next remaining run number is located, and if non-existent the run with maximum objective function is selected. The largest element of the projection vector, RS, within the bounds of the selected run is identified as the "datum row number". The datum row number is used for subsequent derivation of a vertical projection vector defined for that part of the image which extends to either side of the datum row number by a predefined extent. The elements of the vertical projection vector are run-length encoded, as before, such that each run signifies a consecutive sequence of non-zero elements and an objective function is computed for each run as before. The mode of the objective functions for various runs within the projection vector is computed, and all runs whose objective functions deviate by more than a predefined value from the mode are suppressed. A search is next initiated along columns passing through the center of the surviving runs in the vertical projection vector, CS, in an ascending or descending row number direction, based on the orientation of the device, for sustained transitions from 0 to 1 in the binary image.

The resulting point set are viewed as the lead toe points and are subjected to a fast Hough transform which yields the longest subset of colinear points in the incident set. The points that survive the last operation are fitted to a line, T1, (FIG. 5) using the method of least squares.

Figure 5:
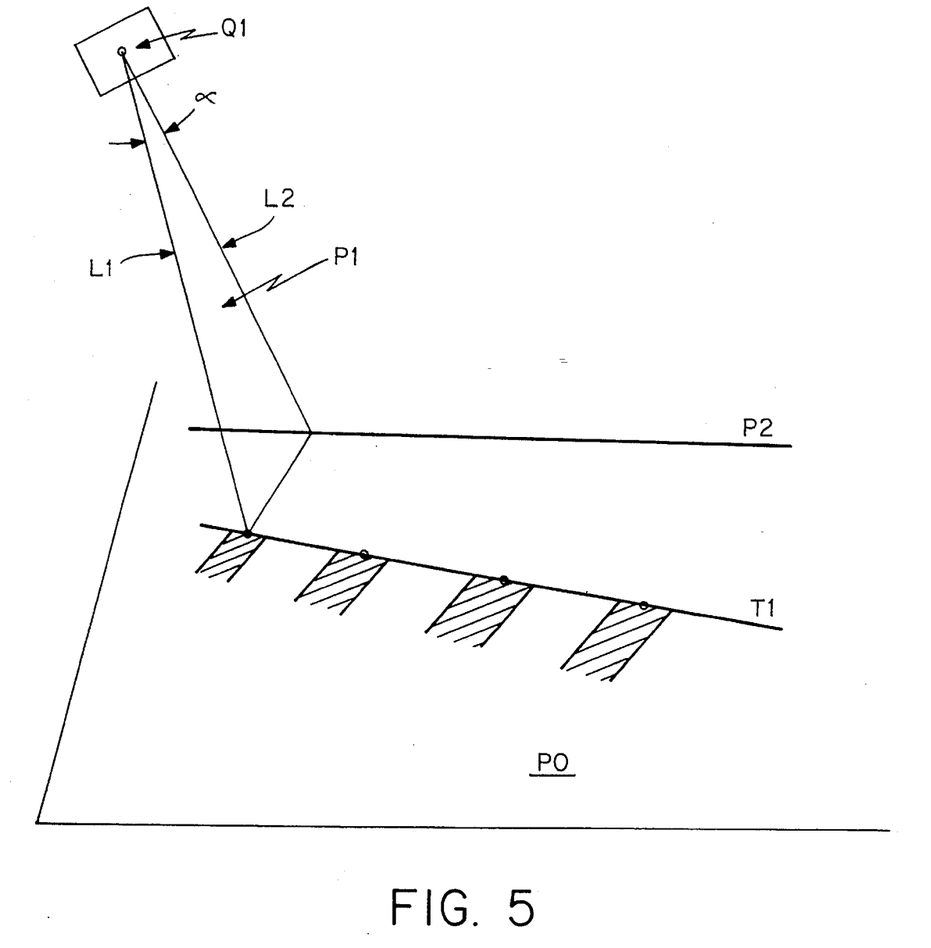
FIG. 5 shows the geometrical relationship between the nominal path followed by the scanning apparatus, the toe line of the IC leads, and the plane generated by the illumination beam.

The equations of the projected lead toe line, T1, the 3D scan line at the datum plane and the laser plane (P1) when all projected onto the machine global coordinate system, are solved to yield the coordinates of the intersections of the lines with the laser plane.

The angle subtended by the two intersection points when the vertex is sited at the laser source point, Q1, reveals the required instantaneous beam deflection angle, alpha.

Path correction may also be effected through sensor translation rather than light beam deflection. The method would be used when the deflection capabilities of the illumination beam were less than required to move the beam from the nominal path line, P2, to the toe line, T1. In this case, the sensor would be translated to compensate for the lack of deflection range.

What is claimed is:

1. A method for steering a laser beam of an active optical triangulation-based three-dimensional sensor by information extracted from an intensity image of a scene previewed by a video camera through laser beam deflection, comprising the steps of: generating an equation of a nominal laser spot path, at a datum plane; generating an equation of a desired path; generating an equation of a laser plane; generating coordinates of a laser point source; projecting all said coordinates onto a global three-space coordinate system; locating intersections of said spot path and said desired path with the said laser plane; computing a subtended angle of said intersections on said laser plane when viewed from a laser source point; and deflecting the laser beam through said computed subtended angle.

2. A method as defined in claim 1, wherein the step of generating an equation of a laser plane comprises projecting the laser beam at substantially two different angles and recording coordinates of illuminated points on a surface, of a calibration block while being raised or depressed through a view volume of the said three-dimensional sensor; fitting said recorded coordinates of said illuminated points in a local space of the said three-dimensional sensor to a resultant plane by a least squares method; and designating a laser plane in the location of said fitted plane.

3. A method as defined in claim 2, including the additional steps of: fitting elements of each point set derived from each of said different angles to a line using the method of least squares; projecting thereafter said fitted lines onto the equation of said laser plane, forming two coplanar lines intersecting at a point; and designating the coordinates of the laser point source to be at the location of said intersecting point.

4. A method as defined in claim 1, wherein said information extracted from an intensity image utilizes adaptive thresholding of a gray level image to binarize the image comprising the steps of: acquiring the image and constructing its original gray level histogram; area quantizing said histogram; generating a discrete function from a span of successive area quanta; differentiating said function and locating two successive maxima of said function; locating 5. A method as defined in claim 1, including the steps of: pivoting said video camera into positions ion either side of said three-dimensional sensor for previewing a scene of interest with respect to said three-dimensional sensor.

6. A method as defined inn claim 1, including the steps of: providing a lens assembly detached from said video camera; translating said lens assembly to positions on either side of said three-dimensional sensor for imaging a scene of interest onto a retina of said video camera in front of said three-dimensional sensor.

7. A method for translating a laser point source in an active optical triangulation-based three-dimensional sensor guided by information extracted from an intensity image of a scene previewed by a two-dimensional sensor through three-dimensional sensor translation, comprising the steps of: generating an equation of a nominal laser spot path at a datum plane; generating an equation of a desired path; projecting an equation of said spot path and said desired path onto said datum plane; intersecting said spot path and said desired path at a point of intersection and at an angle between the paths; deriving coordinates of said intersection point and said angle between the paths; computing sensor translation at any point on the said projected nominal laser spot path and distance from said point of intersection, said translation being the product of said distance and tangent of said angle; and translating the three-dimensional sensor through said computed sensor translation.

8. A method for segmentation of lead toe points and subsequent extraction of a lead toe line from a binarized image of a quad flat pack device comprising the steps of: forming a lateral projection vector of said binarized image; finding a maximum element value in the said projection vector and clipping all elements of the said vector at a predetermined fraction of the said maximum; run-length coding said clipped projection vector so that each run signifies a sequence of non-zero elements; generating an objective function for each run based on a product of each run-length by a weighing function representing cumulative sum of the points supported by that run of the projection vector; locating the run exhibiting said maximum objective function and proceeding along ascending or descending row numbers, dependent on orientation of the device, to locate the next run number, and if the next run number is non-existent the run with maximum objective function is retained instead; locating a maximum value of said projection vector within bounds of the retained run number, and arriving thereby at a datum row number for subsequent formation of a vertical projection vector; forming a vertical projection vector for a part of an image that extends to either side of the datum row number by a predetermined extent, elements of said vertical projection vector being run-length encoded so that each run signifies a consecutive sequence of non-zero elements; computing an objective function for each run as a product of run length and a weighing factor derived from cumulative sum of the projection vector within bounds of the run; finding a mode of the objective functions and suppressing runs exhibiting objective functions deviating by more than a predetermined value from said mode; initiating a search at columns passing through a center of surviving runs in an ascending or descending row number direction dependent on orientation of the device for sustained transition from 1 to 0 in the binarized image for obtaining a resulting point set corresponding to lead toe points subjected to fast Hough transform yielding a longest subset of colinear points supporting the lead toe line; fitting said colinear points to a line using a least square method; and designating a lead toe line in the location of said fitted line.

* * * * *